US010197128B2

(12) United States Patent
Shahosseini et al.

(10) Patent No.: US 10,197,128 B2
(45) Date of Patent: Feb. 5, 2019

(54) HYDRAULIC TORQUE COMPENSATION DEVICE

(71) Applicant: HUTCHINSON AEROSPACE & INDUSTRY Inc., Burbank, CA (US)

(72) Inventors: Iman Shahosseini, Woodland Hills, CA (US); John Nall, Granada Hills, CA (US); Ivan Roson, Long Beach, CA (US)

(73) Assignee: HUTCHINSON AEROSPACE & INDUSTRY Inc., Burbank, CA (US)

( * ) Notice: Subject to any disclaimer, the term of this patent is extended or adjusted under 35 U.S.C. 154(b) by 53 days.

(21) Appl. No.: 15/423,719

(22) Filed: Feb. 3, 2017

(65) Prior Publication Data

US 2018/0223944 A1 Aug. 9, 2018

(51) Int. Cl.
| | |
|---|---|
| *B64D 27/00* | (2006.01) |
| *F16F 13/10* | (2006.01) |
| *B60K 5/12* | (2006.01) |
| *B64D 27/12* | (2006.01) |
| *B64D 27/26* | (2006.01) |
| *F02C 7/20* | (2006.01) |
| *F16F 9/28* | (2006.01) |
| *F16F 15/02* | (2006.01) |
| *F16F 15/023* | (2006.01) |

(52) U.S. Cl.
CPC .......... *F16F 13/10* (2013.01); *B60K 5/1208* (2013.01); *B60K 5/1283* (2013.01); *B64D 27/12* (2013.01); *B64D 27/26* (2013.01); *F02C 7/20* (2013.01); *F16F 9/28* (2013.01); *F16F 15/022* (2013.01); *F16F 15/023* (2013.01); *B60Y 2200/51* (2013.01); *B64D 2027/262* (2013.01); *B64D 2027/264* (2013.01)

(58) Field of Classification Search
CPC .......... F16F 13/10; F16F 13/26; F16F 15/022; F16F 15/023; B60K 5/1208; B60K 5/1266
USPC ............................................. 248/557; 244/54
See application file for complete search history.

(56) References Cited

U.S. PATENT DOCUMENTS

| | | | | |
|---|---|---|---|---|
| 4,466,390 A | * | 8/1984 | Babitzka | F01L 9/025 123/90.12 |
| 5,918,833 A | * | 7/1999 | Najand | B60K 5/1208 244/54 |

(Continued)

FOREIGN PATENT DOCUMENTS

FR 2 698 848 6/1994

*Primary Examiner* — Todd M Epps
(74) *Attorney, Agent, or Firm* — Clark & Brody

(57) ABSTRACT

A hydraulic torque compensation device comprises a pair of housings, a first housing including a first high pressure liquid chamber and a second low pressure liquid chambers, a second housing having a third high pressure liquid chamber, a fourth accumulator chamber, and a fifth low pressure chamber that is defined by a wall and an end of the second housing. A first main duct links the first chamber of the first housing to the third chamber of the second housing. A second main duct links the second chamber of the first housing to the fifth chamber of the second housing. Each housing also include a piston, the first chamber between a first piston body and an end of the first housing and the third chamber between a second piston body and the wall. The device ensures a counter action to engine loads when a positive torque is applied.

19 Claims, 5 Drawing Sheets

(56) References Cited

U.S. PATENT DOCUMENTS 7,063,290 B2 * 6/2006 Marche .................. B64D 27/26
                                                        244/54
9,617,918 B2 * 4/2017 Jamshidiat ............. B64D 27/26

* cited by examiner

HYDRAULIC TORQUE COMPENSATION DEVICE

The invention deals with a liquid torque compensation device, especially for aircraft applications.

Such devices are generally known as hydraulic torque compensation devices.

The invention also deals with a system comprising such a hydraulic torque compensation device and side isolators.

It also concerns a set comprising such a system and a support structure for an aircraft engine, on which said system in mounted.

Hydraulic compensation torque devices are known.

For example, we may refer to the following documents: U.S. Pat. No. 7,063,290, FR 2698848 or U.S. Pat. No. 5,918,833.

An aim of the invention is to propose a hydraulic torque compensator device which provides for a higher performance to those proposed in the prior art, and especially in the above-mentioned documents.

In that aim, the invention proposes a hydraulic torque compensation device comprising:
  a first housing containing:
    a first piston comprised of a body and a rod,
    a first chamber arranged between said body of the first piston and a first end of the first housing, said first chamber containing a high pressure liquid,
    a second chamber arranged between said body of the first piston and a second end of the first housing, through which said rod of the first piston extends towards the exterior, said second chamber containing a low pressure liquid;
  a second housing containing:
    a second piston comprised of a body and a rod,
    a wall extending through the whole section of said second housing, through which said rod of the second piston passes,
    a third chamber defined between said body of the second piston and said wall, said third chamber containing a high pressure liquid,
    a fourth chamber, with a variable volume, defined between said body of the second piston and a first end of the second housing, said fourth chamber containing a low pressure liquid,
    a fifth chamber defined between said wall and a second end of the second housing, through which the rod of the second piston extends towards the exterior, such that the fourth and fifth chambers surround the third chamber, said fifth chamber also comprising a low pressure liquid,
    an auxiliary duct linking the fourth chamber and the fifth chamber;
  a first main duct linking the first chamber, comprising a high pressure liquid, of the first housing to the third chamber, also comprising a high pressure liquid, of the second housing, and
  a second main duct linking the second chamber, comprising a low pressure liquid, of the first housing to at least one of the fifth or fourth chamber, both also comprising a low pressure liquid, of the second housing, and/or a second chamber with a variable volume The device may also have at least one of the following features, taken alone or in combination:
  the second end of the first housing is made of a resilient bushing fixedly mounted on the rod of the first piston;
  said resilient bushing is made of elastomer and metal;
  the second housing is made of a resilient bushing fixedly mounted on the rod of the second piston;
  said resilient bushing is made of elastomer and metal;
  the body of the first piston comprises at least a one-way valve, allowing a liquid transfer from the second chamber, namely the low pressure chamber of the first housing, to the first chamber, namely the high pressure chamber of the first housing where the high pressure chamber exhibits an abnormal liquid pressure below the liquid pressure in the low pressure chamber;
  the body of the second piston comprises at least a one-way valve, allowing a liquid transfer from the fourth chamber and/or from the fifth chamber, namely a low pressure chamber of the second housing, to the third chamber, namely the high pressure chamber of the second housing where the high pressure chamber exhibits an abnormal liquid pressure below the liquid pressure in the low pressure chamber;
  the fourth chamber presents a resilient side wall to ensure that the fourth chamber presents a variable volume;
  the resilient side wall is a bellows;
  the bellows is made of elastomer and metal;
  the second housing comprises a rigid wall surrounding the fourth chamber in order to provide a stop intended to limit the expansion of the fourth chamber;
  the fourth chamber comprises a spring-loaded moveable end wall to ensure that the fourth chamber presents a variable volume;
  the auxiliary duct is made within the rod of the second piston;
  the device comprises only two housings.

The invention also concerns a system comprising
  a hydraulic torque compensation device according to the invention;
  a first side isolator mechanically linked to the rod of the first piston belonging to the first housing; and
  a second side isolator mechanically linked to the rod of the second piston belonging to the second housing.

The system may also have at least one of the following features, taken alone or in combination:
  the first side isolator is mechanically linked to the rod of the first piston via a rotational joint and wherein the second side isolator is mechanically linked to the rod of the second piston via another rotational joint;
  the rod of the first piston and the rod of the second piston are arranged in a parallel manner.

The invention finally concerns a set comprising a support structure for an aircraft engine, said support structure presenting a longitudinal axis and a system according to the invention mounted on said support structure such that the rod of the first piston and the rod of the second piston are both arranged in a plane perpendicular to said longitudinal axis.

The invention will be better understood and other aims, advantages and features thereof will appear more clearly by reading the following description, made in regard of the following annexed figures.

Figure 1:
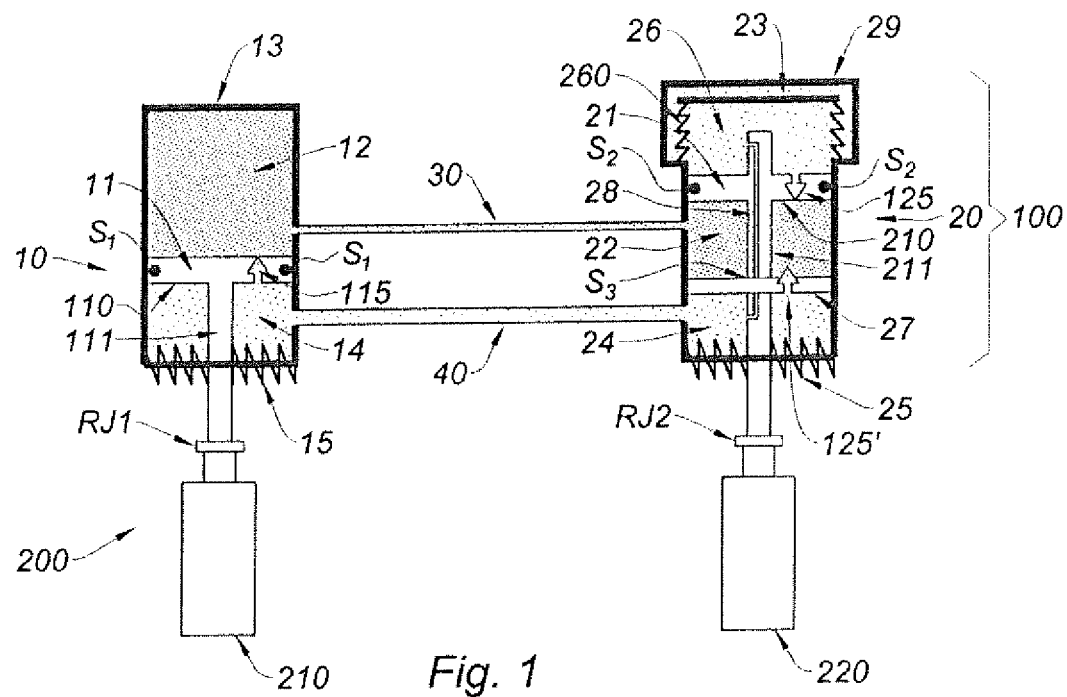
FIG. 1 is a schematic view of the hydraulic torque compensation device according to the invention, in a rest position.
Figure 9:
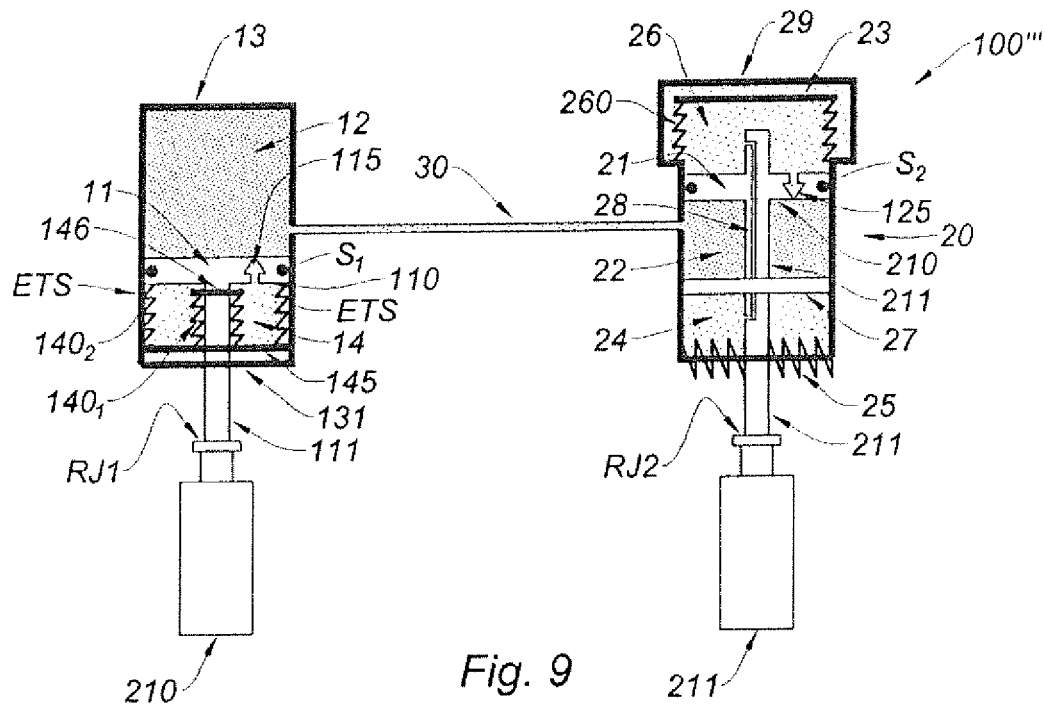
Figure 10:
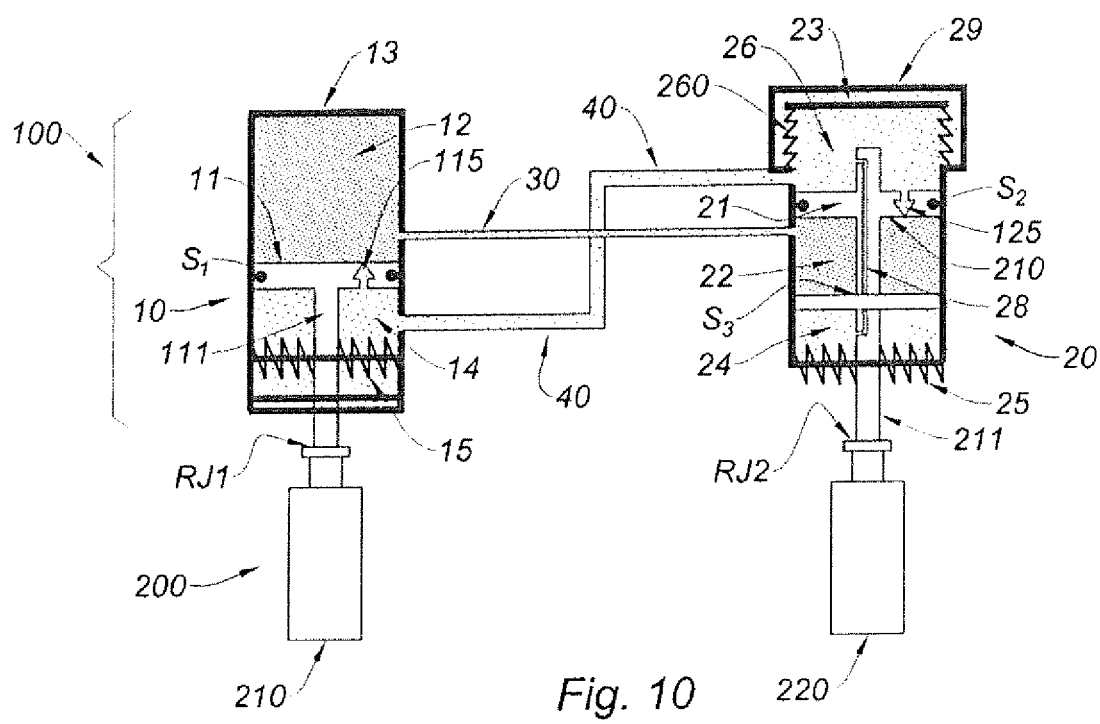

FIG. 9 still shows another variant of the hydraulic torque compensation device of FIG. 1;

FIG. 10 show an alternative to the hydraulic torque compensation device of FIG. 1.

In FIG. 1, we can see a hydraulic torque compensation device 100 according to the invention.

The device 100 comprises a first housing 10 (right housing) and a second housing 20 (left housing).

The first housing 10 contains a first piston 11 comprised of a body 110 and a rod 111.

The first housing 10 also contains a first chamber 12 arranged between the body 110 of the first piston 11 and a first end 13 of the first housing 10. The first chamber 12 contains a high pressure liquid, for example The first housing 10 also contains a second chamber 14 arranged between said body 110 of the first piston 11 and a second end 15 of the first housing 10. The rod 111 of the first piston 11 extends through this second end 15, towards the exterior. The second chamber 14 contains a low pressure liquid.

A seal S1 ensures the sealing between the body 110 of the piston 11 and the housing, to avoid any liquid passage between both chambers 12, 14.

The second housing 20 contains a piston, called second piston 21, comprised of a body 210 and a rod 211.

The second housing 20 additionally contains a wall 27 extending through the whole section of the second housing 20. The rod 211 of the second piston 21 passes through the wall 27.

The second housing 20 also contains a chamber, called third chamber 22, defined between said body 210 of the second piston 21 and said wall 27. The third chamber 22 contains a high pressure liquid.

The second housing 10 contains another chamber, called fourth chamber 26, with a variable volume, defined between said body 210 of the second piston 21 and a first end 23 of the second housing 20. The fourth chamber 26 contains a low pressure liquid. The fourth chamber 26 serves as an accumulator.

A seal S2 ensures the sealing between the body 210 of the piston 11 and the housing, to avoid any liquid passage between both chambers 22, 26.

As shown in FIG. 1, to ensure that the fourth chamber 26 has a variable volume, this latter presents a resilient side wall 260. The resilient side wall 260 is advantageously a bellows, which in particular may be made of elastomer and metal.

Where such a bellows 260 is chosen, the second housing 20 advantageously comprises a rigid wall 29 surrounding the fourth chamber 26 in order to provide a stop intended to limit the expansion of the fourth chamber 26. In such a case, the bellows 260 is fixedly mounted at a base of the rigid wall 29 of the second housing 20. The rigid wall 29 may be made of one piece with the remaining of the part of the second housing 20 which defines the high pressure chamber 22 or may be an additional structure fixedly mounted on this part. It should be noted that the rigid wall 29 also helps to mechanically protect the bellows 260 from environmental impacts.

The second housing 20 also contains another chamber, called fifth chamber 24, defined between said wall 27 and a second end 25 of the second housing 20, through which the rod 211 of the second piston 21 extends towards the exterior. As the rod 211 passes through the wall 27, a seal S3 is installed between the rod 211 and the wall 27. The fifth chamber 24 also comprises a low pressure liquid. Given the arrangement of the fourth and fifth chambers 26, 24, we can note that the fourth chamber 26 and the fifth chamber 24 surround the third chamber 22.

A duct 28, called auxiliary duct, links the fourth chamber 26 and the fifth chamber 24, namely the low pressure chambers of the second housing 20. In that way, the fifth chamber 25 can take advantage of the volume compensation brought by the fourth chamber 24, which presents a variable volume.

Advantageously, and as shown in FIG. 1 for instance, the auxiliary duct 28 is made within the rod 211 of the second piston 21. This design is few space consuming.

Moreover, the device 100 comprises a duct, called first main duct 30, linking the first chamber 12, which comprises a high pressure liquid, of the first housing 10 to the third chamber 22, which also comprises a high pressure liquid, of the second housing 20.

In addition, the device 100 comprises another duct, called second main duct 40, linking the second chamber 14, comprising a low pressure liquid, of the first housing 10 to the fifth chamber 24, also comprising a low pressure liquid, of the second housing 20. In that way, the second chamber 14 can take advantage, via the second main duct 40 and the auxiliary duct 28, of the compensation volume brought by the fourth chamber 24, which presents a variable volume. In a variant, as shown in FIG. 10, the second main duct 40 may connect the second chamber 14 to the fourth chamber 26 directly (the one-way valve 125' is not represented in this FIG. 10). Of course, we may have two ducts, one linking the second chamber 14 to the fifth chamber 24 and another one linking the second chamber 14 to the fourth chamber 26 (not shown).

It should be noted that the accumulator 26 (fourth chamber) is useful to compensate the volume change where, in operation, liquid is transferred by the main ducts 30, 40 from a housing to the other one. And as there is an auxiliary duct between the chambers 24, 26 and a main duct 40 between the chambers 14, 26, one accumulator (variable volume) is sufficient for the whole device 100.

Advantageously, and as shown in FIG. 1, the second end 15 of the first housing 10 is made of a resilient bushing 15 fixedly mounted on the rod 111 of the first piston 11. For example, the resilient bushing 15 is made of elastomer and metal. The resilient bushing 15 can, in operation, follow the movements of the rod 111 while avoiding any leakage of liquid between the second chamber 14 and the external environment of the device 100. The resilient bushing 15 also provides for an axial guidance for the rod 111 of the first piston 11.

Nevertheless, in a variant (not illustrated), we may have an end 15 made of a fixed wall comprising an orifice for the rod 111 of the first piston 11 passes through the orifice, a seal being further installed within the orifice, between the rod 111 of the first piston 11 and the fixed wall. The fixed wall would also provide for a guidance for the rod 111 of the first piston 11.

In a similar manner and advantageously, the second end 25 of the second housing 20 is made of a resilient bushing fixedly mounted on the rod 211 of the second piston 21. For example, the resilient bushing 25 is made of elastomer and metal. As for the first housing 10, the resilient bushing 25 can, in operation, follow the movements of the rod 211 while avoiding any leakage of liquid between the fifth chamber 24 and the external environment of the device 100. The resilient bushing 25 also provides for an axial guidance for the rod 211 of the first piston 21.

Nevertheless, in a variant (not illustrated), and as already explained previously for the first housing 10, we may have an end 25 made of a fixed wall comprising an orifice for the rod 211 of the first piston 21 passes through the orifice, a seal being further installed within the orifice, between the rod 211 of the first piston 21 and the fixed wall.

Furthermore, and as illustrated for example in FIG. 1, the body 110 of the first piston 11 advantageously comprises at least a one-way valve 115, allowing a liquid transfer from the second chamber 14, namely the low pressure chamber of the first housing 10, to the first chamber 12, namely the high pressure chamber of the first housing 10.

Indeed, where there is a liquid leakage from the high pressure chamber 12 towards the low pressure chamber 14, the liquid collected by the low pressure chamber 14 can be quickly turned back to the high pressure chamber 12, where the high pressure chamber 12 exhibits an abnormal liquid pressure, below the liquid pressure in the low pressure chamber 14. It may happen, where liquid passes from the high pressure chamber 12 to the low pressure chamber 14 around the body 110 of the first piston 11.

In a similar way, the body 210 of the second piston 21 may comprise at least a one-way valve 125, allowing a liquid transfer from the fourth chamber 26, namely a low pressure chamber of the second housing 20, to the third chamber 22, namely the high pressure chamber of the second housing 20. In addition or alternatively, a one-way valve 125' may be provided within the wall 27, to allow for liquid transfer from the fifth chamber 24 towards the third chamber 22.

We then have the same advantages as those described previously.

However, in a more general way, installing a one-way valve, as described here above, only in one of the bodies 110, 210 is sufficient to those advantages.

The one-way 115, 115', 125 valve may be a check valve or a pressure-reducing valve.

As can be understood from the preceding description, the hydraulic torque compensation device 100 is a closed circuit. Indeed, the liquid encased in the device 100 cannot, in normal operation, get out from the device 100.

Moreover, the high pressure chambers 12, 22 are never close to the end 15, 25 of the respective housing 10, 20 through which the rod 111, 211 extends towards the exterior. In other words, it is still a low pressure chamber 14, 24 which is close to the exterior of the device. It highly limits the risk of liquid leakage towards the exterior.

Furthermore, if a seal S1, S2 or S3 wears out, liquid will pass through a high pressure chamber towards a low pressure chamber and will be maintained in the device 100 so that it can still work by passing through the main ducts 30, 40 and thanks to the help of the accumulator 26 (fourth chamber). Of course, the presence of at least a one-way valve 115, 125 is advantageous to refill the high pressure chambers more quickly.

Figure 4:
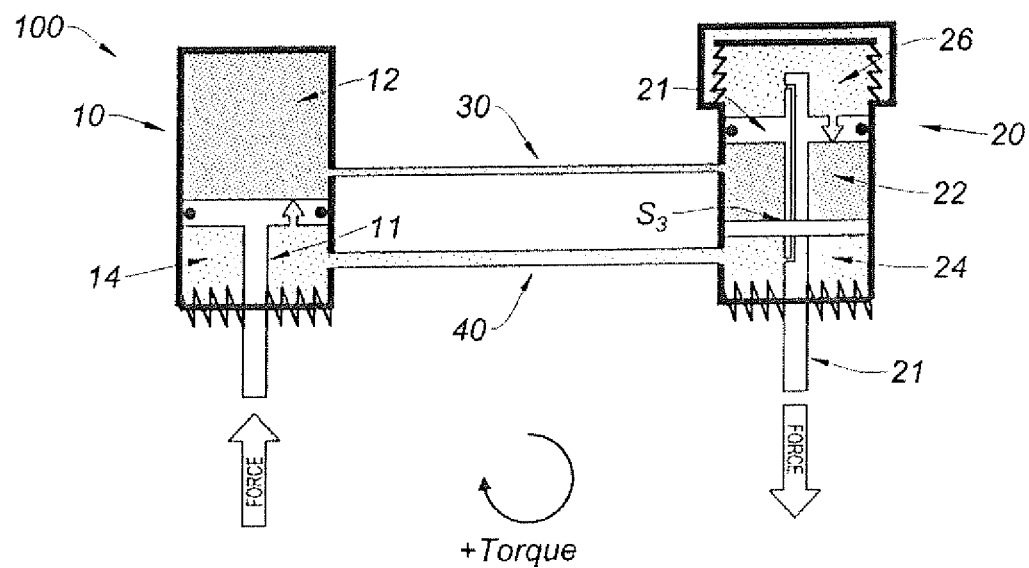
FIG. 4 is the hydraulic torque compensation device of FIG. 1, where a positive torque (when the engine is running) is applied to it.
Figure 5:
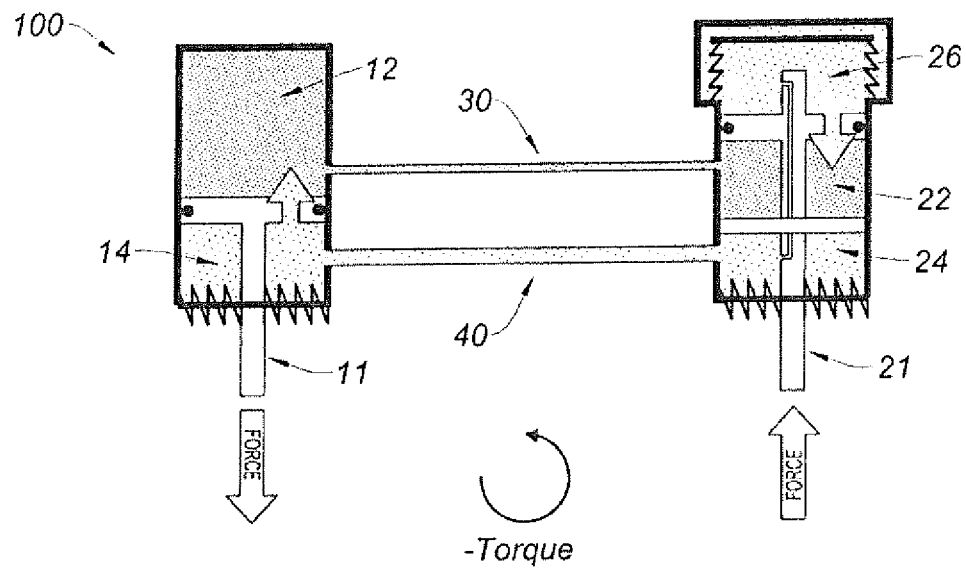
FIG. 5 is the hydraulic compensation device of FIG. 1, where a negative torque is applied to it.
Figure 6:
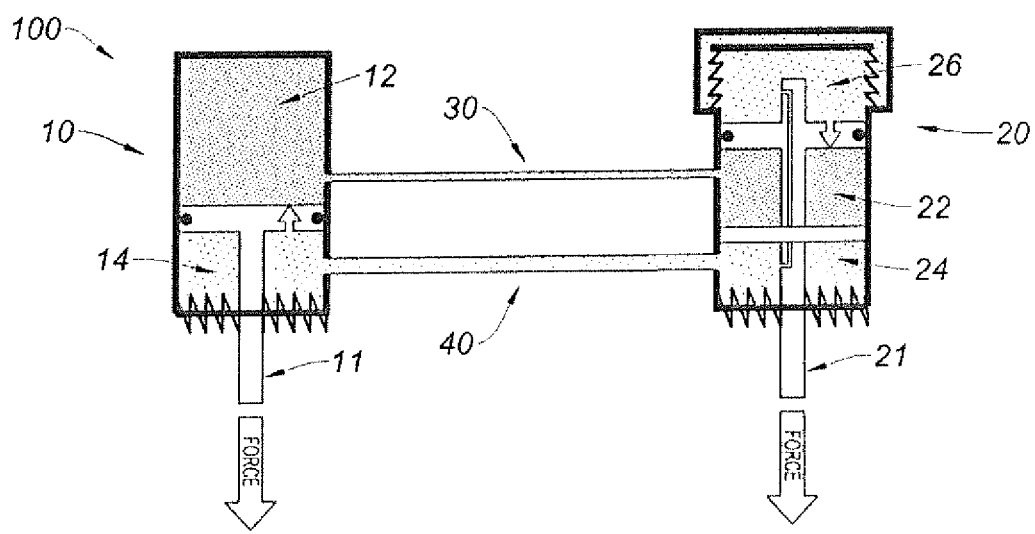
FIG. 6 is the hydraulic compensation device of FIG. 1, where each of housing of the device is submitted to a force oriented in the same direction (upward or downward)

The operation of a device 100 according to the invention will be better understood thanks to the following description, which is based on FIGS. 4 to 6 (in these figures however, the alternative or additional one-way valve 125' is not represented), in comparison to the position of the device as shown in FIG. 1 (rest position).

FIG. 4 corresponds to a situation in which the engine is running. The engine brings about a positive torque which implies that the force applied to the first piston 11 of the hydraulic torque compensation device 100 is upward and the force applied to the second piston 21 is downward.

As a consequence, in a first step, the pressure is rising in the first chamber 12 (first housing 10), as well as in the third chamber 22 (second housing 20). However, once the pressure in both chambers increases, both housings become more resistant to the forces applied until they completely oppose (reaction) to the applied forces. The pressure therefore prevent any further movement of the pistons. In other words, this reaction applies a counter rotational stiffness on the engine, and reduces transmitted loads through the side isolators 210, 220. The link 30 between bot high pressure chambers allow for obtaining an pressure equilibrium between both chambers.

FIG. 5 corresponds to a situation in which the engine undergoes a negative torque. This situation may be encountered, for example, where the engine passes from the running position to the stop position. It implies that the force applied to the first piston 11 of the hydraulic torque compensation device 100 is downward and the force applied to the second piston 21 is upward.

In these conditions, the liquid is vacuumed from the high pressure chambers 12, 22. The device 100 does not resist to the negative couple and the resistance comes from the side isolators 210, 220. If the pressure in the high pressure chambers becomes too low, because of the level of the negative torque applied, liquid may then passes through the valves 115, 125 to refill the high pressure chambers.

FIG. 6 shows a situation where both housings 10, 20 are submitted to a force oriented in the same direction. It therefore corresponds to a situation where both pistons 11, 21 undergo either an upward force or a downward force. It may happen when the engine is ON or when the engine is OFF.

In such a situation, one of the high pressure chamber expands while the other high pressure chamber contracts, depending on the applied force direction. The liquid is therefore transferred via duct 30 from one high pressure chamber to the other high pressure chamber. The device 100 does not provide any resistance in this situation. Accordingly, the side isolators 210, 220 are effective to carry engine loads and dampen vibrations.

Accordingly, the device 100 proposed in the invention ensures a counter action to the engine loads where a positive torque is applied. In other situations, the device 100 is transparent and let the side isolators 210, 220 act.

Example of Design for the Device 100:
Liquid (hydraulic fluid): mineral oil base like MIL-H-5606, mixture of water-glycol, silicon oil.
Housing diameter: 2.8 inch.
Piston diameter: 2.5 inch.
Piston rod diameter: 1.4 inch.
Duct diameter (component 30 or 40): 0.3 inch.
Distance between two housings: about 30 inch.
Height of a high pressure chamber: 0.8 inch.
In operation, we have approximately the following conditions:
Pressure of the high and low chambers in the rest position: atmospheric pressure (about 15 psi).

Pressure of a high pressure chamber in normal operation conditions: 3000 to 5000 psi.

Pressure of a low pressure chamber in normal operating conditions: atmospheric pressure.

We may consider other embodiments for the device according to the invention.

Figure 7:
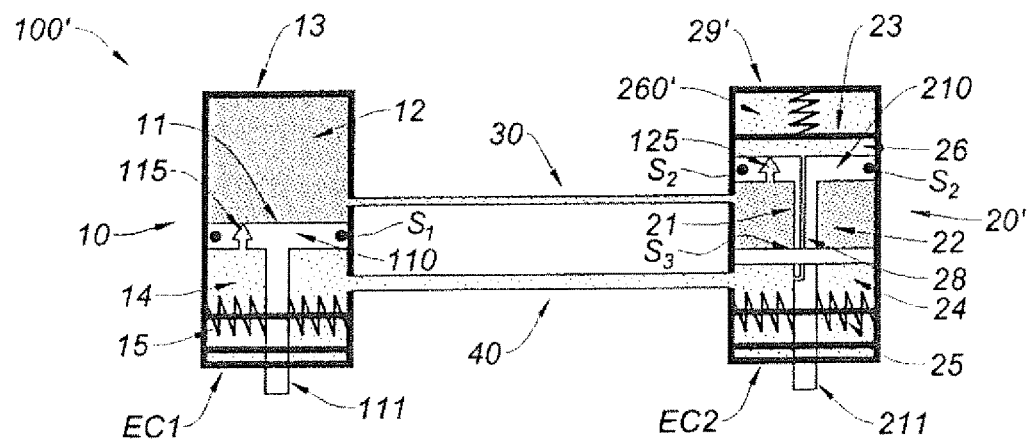
FIG. 7 shows a variant of the hydraulic torque compensation device shown in FIG. 1.

In FIG. 7, the bellows 260 is replaced by a spring-loaded wall 23 to ensure that the fourth chamber has a variable volume. The wall 23 forms an end of the second housing 20', as in FIG. 1. A spring 260' is attached to said wall 23 and to another wall 29' surrounding the fourth chamber 26 in order to provide a stop intended to limit the expansion of the fourth chamber 26. Consequently, the wall 29' has the same function as the wall 29 of FIG. 1.

Moreover, in FIG. 7, we have also extra caps EC1, EC2 on the device 100' which are disposed over the ends 15, 25 of the respective housings 10, 20 to better protect said ends, for example formed of resilient bushings, against the environment and provide a supplemental guidance for the respective rod 111, 211.

The presence of such caps EC1, EC2 is optional.

Nevertheless, it should be noted that such extra caps EC1, EC2 may also be provided together with the device 100 illustrated in FIG. 1.

Figure 8:
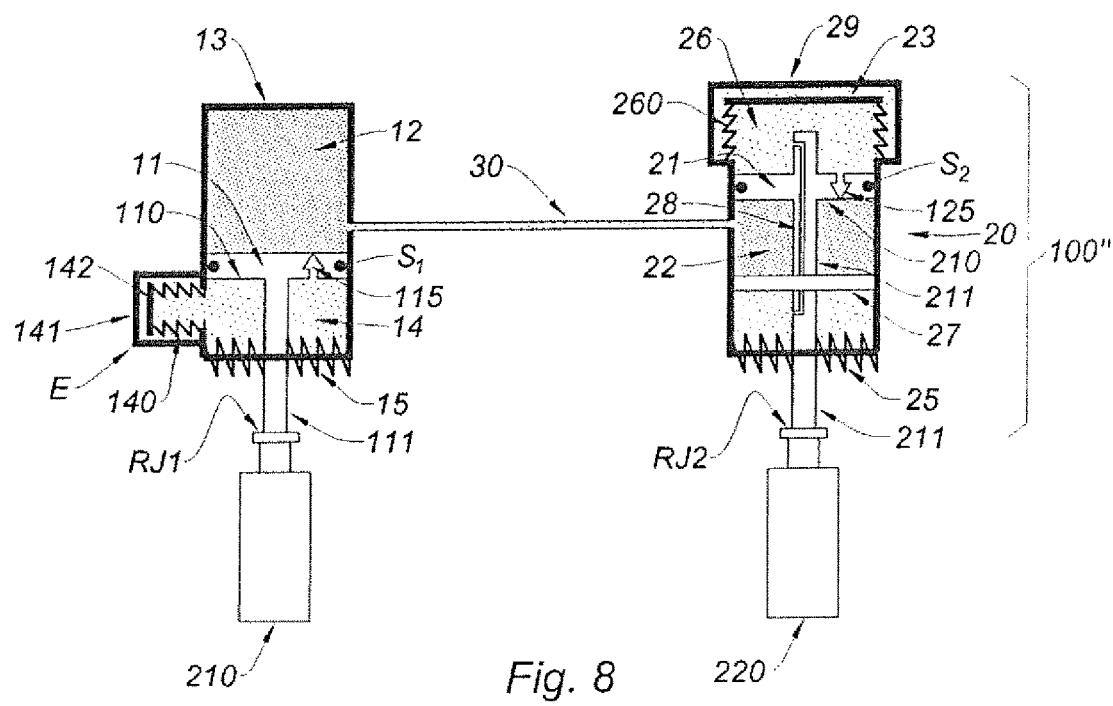
FIG. 8 shows another variant of the hydraulic torque compensation device of FIG. 1.

FIG. 8 proposes an embodiment wherein an additional compensation volume chamber is provided, with respect to the configuration of FIG. 1, at the level of the of the second chamber 14 (low pressure) belonging to the first housing 10. In that embodiment, the second chamber 14 presents a variable volume. In such a case, the second main duct 40 may be suppressed. The second housing is identical to the second housing of FIG. 1.

In the embodiment of FIG. 1, the second main duct 40 is useful for the second chamber 14 (first housing) to take advantage of the volume compensation provided by the bellows 260 of the second housing 20.

However, where a specific volume compensator is provided at the first housing 10, the second main duct 40 is no longer necessary, even though said second main duct 40 may be maintained.

As can be seen, in FIG. 8, the second chamber 14 of the device 100" therefore includes an extension E which lateral wall is made up of a bellows 140 and which end wall 142 is a rigid wall. The bellows 140 is attached or mounted at its base on the housing 10.

Moreover, the first housing 10 then advantageously comprises a rigid wall 141 surrounding the extension E of the second chamber 14 in order to provide a stop intended to limit the expansion of the bellows 140. The rigid wall 141 may be made of one piece with the remaining part of the first housing 10 or may be an additional structure fixedly mounted on this part. It should be noted that the rigid wall 141 also helps to mechanically protect the bellows 140 from environmental impacts.

In FIG. 9, we show an alternative to the embodiment of FIG. 8. In FIG. 9, the device 100''' is such that the whole second chamber 14 forms a compensation volume and then presents a variable volume. Here gain, and as represented, the second main duct 40 is not necessary, even though it may be maintained.

Volume compensation is carried out by a bellows. The bellows comprises a first bellows part 140$_1$ mounted around the piston rod 111 and a second bellows part 140$_2$ mounted against the internal wall of the first housing 10. The two parts 140$_1$, 140$_2$ of the bellows are linked together by a wall 145, preferably rigid, which forms the lower part of the second chamber 14. A central wall 146 allows linking the upper part of the first bellows part 140$_1$ to the piston rod 111. Moreover, the external top sides ETS of the second bellows part 140$_2$ are fixed to the first housing 10. In that way, the whole second chamber 14 may move axially. The wall 145 may then serves as stop, together with the lower wall 131 of the first housing 10, to define the maximum volume of the second chamber 14.

In all cases, the device 100, 100', 100", 100''' according to the invention will advantageously have only two housings 10, 20.

Also, in all cases, the hydraulic compensation torque device has many advantages.

It is a closed circuit, as any liquid leaving a housing towards the other can go back to its initial housing. As a consequence, it requires few maintenance.

It is resistant not only to positive torques, but also to negative torques. As a consequence, where this device is integrated in a system 200 with side isolators, the latter are less solicited which implies a higher lifetime. In the same time, the device is transparent to vertical loads.

Moreover, the use of at least a compensation chamber (example: the fourth chamber in FIG. 1) allows for a compensation in liquid for the low pressure chambers and avoids any cavitation within the low chambers.

Figure 2:
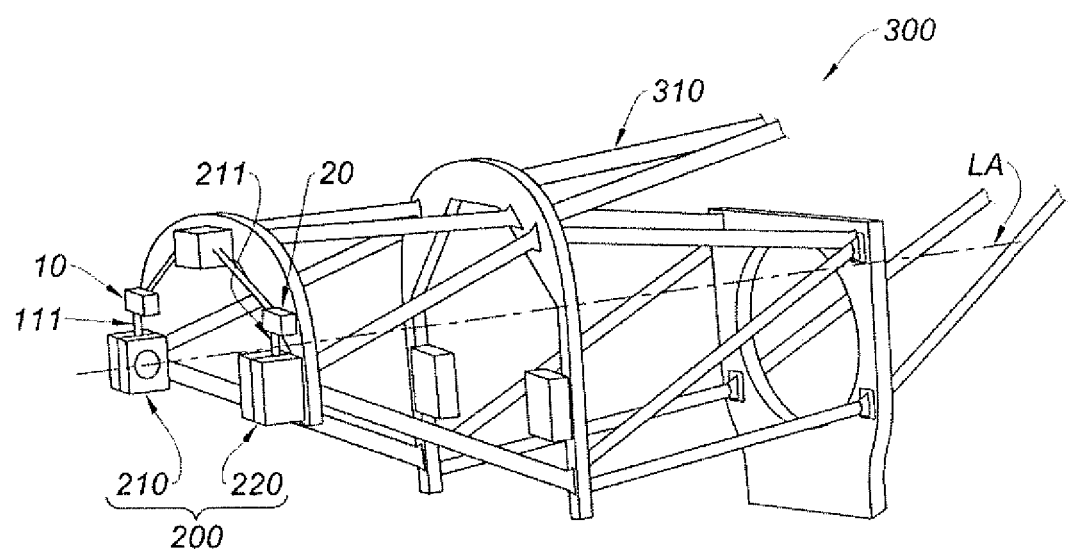
FIG. 2 is a perspective view showing a set comprising a system including the hydraulic torque compensation device of FIG. 1 and side isolators, once mounted a supporting structure of an aircraft engine.
Figure 3:
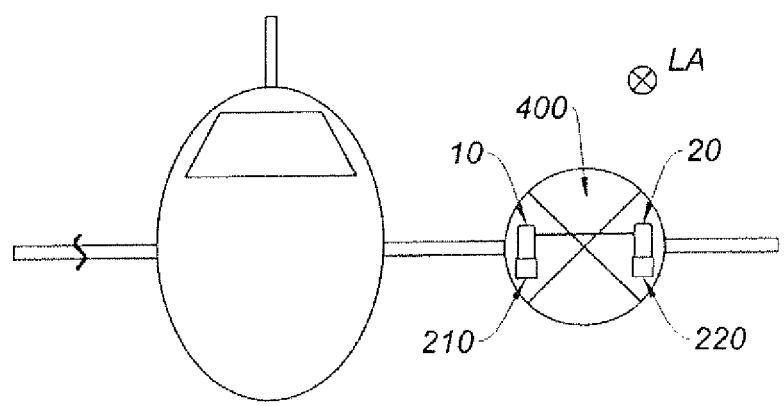
FIG. 3 is a general front view of an aircraft showing more generally where the invention is installed on the aircraft.

In FIGS. 2 and 3, we can see a system 200 according to the invention comprising:
   a device 100, 100', 100", 100''' as described previously;
   a first side isolator 210 mechanically linked to the rod 111 of the first piston 11 belonging to the first housing 10;
   a second side isolator 220 mechanically linked to the rod 211 of the second piston 21 belonging to the second housing 20.

Advantageously, the first side isolator 210 is mechanically linked to the rod 111 by a rotational joint RJ1. In the same way, advantageously, the second side isolator 220 is mechanically linked to the rod 211 by another rotational joint RJ2. This is for the purpose of decoupling axial displacements of the side isolators, and transfer only axial motions to the rods.

Advantageously, and as represented in these figures, the rod 111 of the first piston 11 and the rod 211 of the second piston 21 are arranged in a parallel manner.

In FIGS. 2 and 3, we can also see a set 300 according to the invention comprising:
   a support structure 310 for an aircraft engine 400, said support structure 310 presenting a longitudinal axis LA; and
   a system 200 according to the invention mounted on said support structure 310 such that the rod 111 of the first piston 11 and the rod 211 of the second piston 21 are both arranged in a parallel manner and in a plane perpendicular to the longitudinal axis LA.

The invention claimed is:

1. A hydraulic torque compensation device comprising:
   a first housing containing:
      a first piston comprised of a body and a rod,
      a first chamber arranged between said body of the first piston and a first end of the first housing, said first chamber containing a high pressure liquid,
      a second chamber arranged between said body of the first piston and a second end of the first housing, through which said rod of the first piston extends towards an exterior, said second chamber containing a low pressure liquid;
   a second housing containing:
      a second piston comprised of a body and a rod, a wall extending through a whole section of said second housing, through which said rod of the second piston passes, a third chamber defined between said body of the second piston and said wall, said third chamber containing a high pressure liquid, a fourth chamber, with a variable volume, defined between said body of the second piston and a first end of the second housing, said fourth chamber containing a low pressure liquid, a fifth chamber defined between said wall and a second end of the second housing, through which the rod of the second piston extends towards the exterior, such that the fourth and fifth chambers surround the third chamber, said fifth chamber also comprising a low pressure liquid, an auxiliary duct linking the fourth chamber and the fifth chamber;

a first main duct linking the first chamber to the third chamber of the second housing, the first chamber comprising a high pressure liquid and the third chamber also comprising a high pressure liquid, and either a second main duct linking the second chamber of the first housing to at least one of the fifth or fourth chamber of the second housing, the second chamber comprising a low pressure liquid and the fifth and fourth chambers also comprising a low pressure liquid, or a second chamber with a variable volume.

2. A device according to claim 1, wherein the second end of the first housing is made of a resilient bushing fixedly mounted on the rod of the first piston.

3. A device according to claim 2, wherein said resilient bushing is made of elastomer and metal.

4. A device according to claim 1, wherein the second end of the second housing is made of a resilient bushing fixedly mounted on the rod of the second piston.

5. A device according to claim 4, wherein said resilient bushing is made of elastomer and metal.

6. A device according to claim 1, wherein the body of the first piston comprises at least a one-way valve for a liquid transfer from the second chamber, namely the low pressure chamber of the first housing, to the first chamber, namely the high pressure chamber of the first housing where the high pressure chamber exhibits an abnormal liquid pressure below the liquid pressure in the low pressure chamber.

7. A device according to claim 1, wherein the body of the second piston comprises at least a one-way valve for a liquid transfer from the fourth chamber or from the fifth chamber, namely a low pressure chamber of the second housing, to the third chamber, namely the high pressure chamber of the second housing where the high pressure chamber exhibits an abnormal liquid pressure below the liquid pressure in the low pressure chamber.

8. A device according to claim 1, wherein the fourth chamber comprises a spring-loaded moveable end wall to ensure that the fourth chamber presents a variable volume.

9. A device according to claim 1, wherein the auxiliary duct is made within the rod of the second piston.

10. A device according to claim 1, comprising only two housings.

11. A device according to claim 1, comprising:
a second main duct linking the second chamber of the first housing to at least one of the fifth or fourth chamber of the second housing, the second chamber comprising a low pressure liquid and the fifth and fourth chambers also comprising a low pressure liquid, and a second chamber with a variable volume.

12. A device according to claim 1, wherein the fourth chamber presents a resilient side wall to ensure that the fourth chamber presents a variable volume.

13. A device according to claim 12, wherein the resilient side wall is a bellows.

14. A device according to claim 13, wherein the bellows is made of elastomer and metal.

15. A device according to claim 13, wherein the second housing comprises a rigid wall surrounding the fourth chamber in order to provide a stop intended to limit the expansion of the fourth chamber.

16. A system comprising:
a hydraulic torque compensation device according to claim 1;
a first side isolator mechanically linked to the rod of the first piston belonging to the first housing;
a second side isolator mechanically linked to the rod of the second piston belonging to the second housing.

17. A system according to claim 16, wherein the first side isolator is mechanically linked to the rod of the first piston via a rotational joint and wherein the second side isolator is mechanically linked to the rod of the second piston via another rotational joint.

18. A system according to claim 16, wherein the rod of the first piston and the rod of the second piston are arranged in a parallel manner.

19. A hydraulic torque compensation assembly comprising:
a support structure with a longitudinal axis for an aircraft engine; and
a system according to claim 18 mounted on said support structure such that the rod of the first piston and the rod of the second piston are both arranged in a plane perpendicular to said longitudinal axis.

* * * * *